Oct. 28, 1952 — W. KJELLMAN ET AL — 2,615,680
MEANS FOR EXTRACTING CORES OF SOIL FROM THE GROUND
Filed March 29, 1948 — 2 SHEETS—SHEET 2

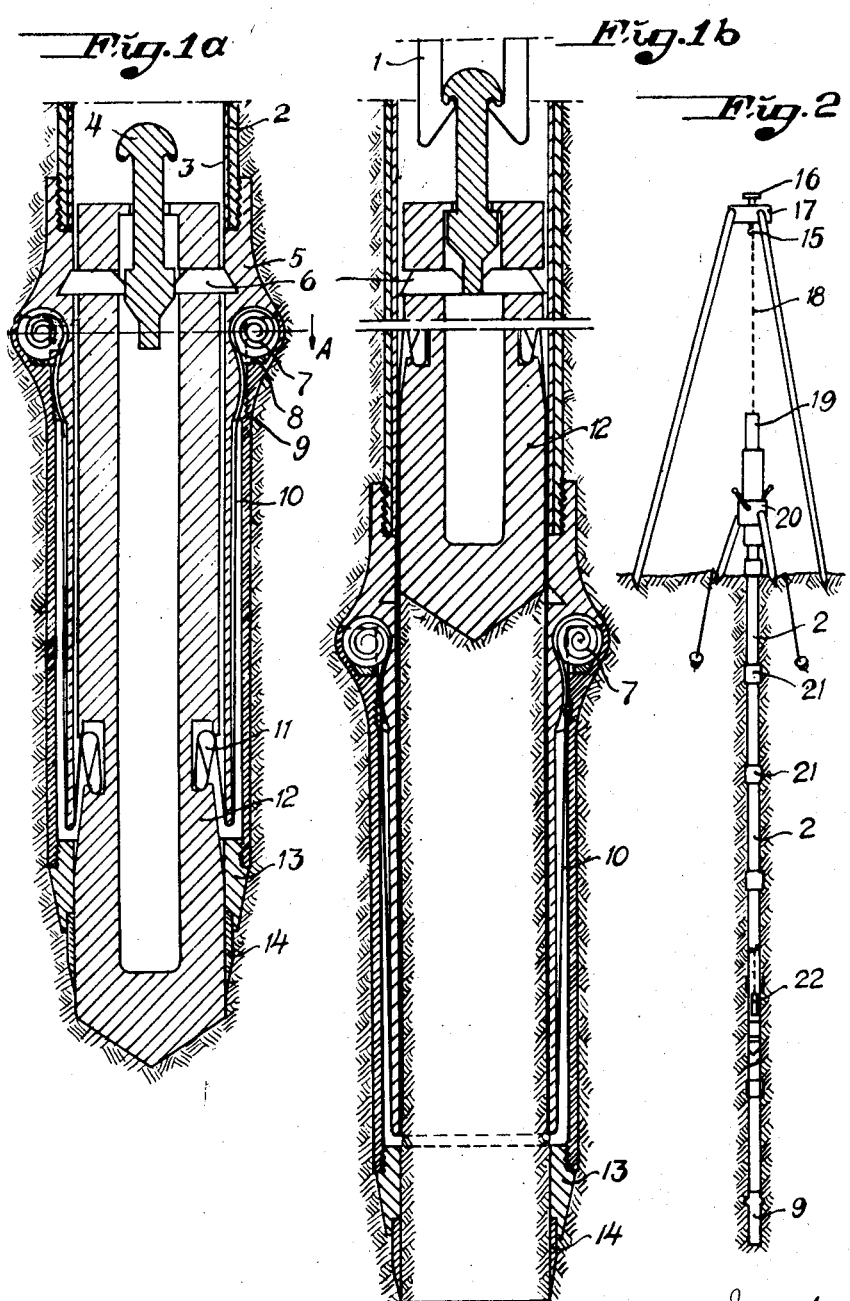

INVENTOR
Walter Kjellman and
Torsten K. E. Kallstenius
BY Cushman Darby Cushman
ATTORNEYS Patented Oct. 28, 1952

2,615,680

UNITED STATES PATENT OFFICE 2,615,680

MEANS FOR EXTRACTING CORES OF SOIL FROM THE GROUND

Walter Kjellman, Stockholm, and Torsten Karl Edmund Kallstenius, Lidingo, Sweden Application March 29, 1948, Serial No. 17,756
In Sweden April 2, 1947

3 Claims. (Cl. 255—1.4)

Our invention relates to a method and a device for extracting cores of soil from the ground.

In the examination of grounds it would be of great value to be able to extract long and continuous cores of soil with undisturbed structure. If, to this end, an ordinary tube is driven into the ground, it will be found, however, that the tube will, to a certain degree, draw with it downwards the core of the soil formed therein, this being a result of the friction and adhesion on the inside of the tube. As a consequence, part of the earth mass immediately below the lower mouth of the tube will be forced away laterally instead of entering the tube. The forcing away will be the more complete the softer this mass is and the harder and longer the already formed core. For this reason, the natural earth strata will be present in the core at a thickness reduced to an unknown extent and with a structure disturbed to an unknown degree. As a result of said forcing away, very short cores only can be obtained in most kinds of earth by means of the above named method.

Attempts have been made to eliminate these inconveniences, but as far as we are aware hitherto no method suitable for extracting long cores has been found.

It is the object of this invention to provide a method and means which render possible the extraction of long and continuous cores of soil with undisturbed structure.

Figure 3A:
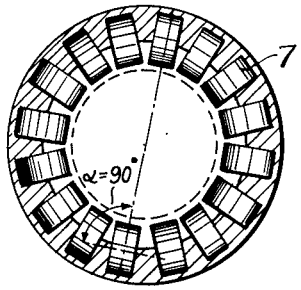
Figure 3B:
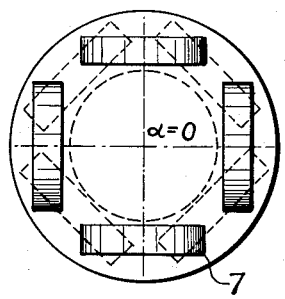
Figure 3C:
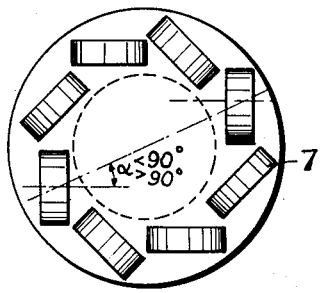
Figure 4:
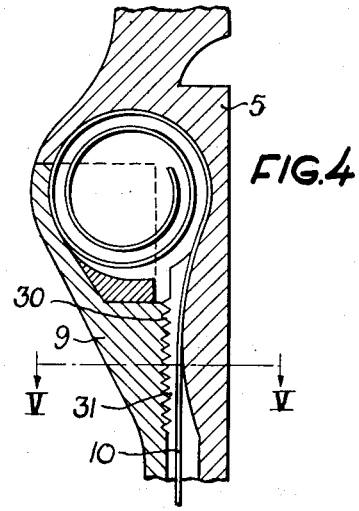
Figure 5:
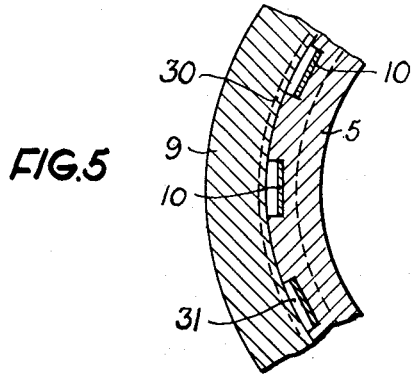

Embodiments of the invention are described hereinbelow with reference to the annexed drawings in which Fig. 1a is a vertical section of a borer constructed in accordance with the invention; Fig. 1b illustrates the borer in another position; Fig. 2 is a view to a reduced scale of the borer with appertaining frame and driving device; Fig. 3a is a section through the wall of the borer along the line A in Fig. 1a; Figs. 3b and 3c are similar sections with modified arrangements of the supply rolls. Fig. 4 is a detail vertical sectional view showing the sections of the cylinder connected together, and Fig. 5 is a sectional view taken substantially along the line 5—5 of Fig. 4.

The borer illustrated comprises three main parts, namely, a lower part which may be termed cylinder, an upper elongation thereof which may be termed tube, and a plunger movable in the cylinder and tube. The cylinder comprises in turn an inner sleeve 5, an outer sleeve 9, a cutter holder 13 and an easily exchangeable cutter 14. The tube which by means of threaded sockets 21, Fig. 2, is joined from portions preferably having a length of three to six feet, consists of a precision drawn inner tube 3 and an outer tube 2, said tubes being, for instance, soldered to each other. A pin 4 and radially displaceable locking bolts 6 are provided in the upper portion of the plunger 12. In the position shown in Fig. 1a, the bolts 6 secure the plunger to the cylinder, whereas the plunger is disengaged in the position shown in Fig. 1b. The supply rolls 7 are placed in recesses 31 in the wall of the cylinder and retained by a ring 8. From the rolls, the metal foils 10 run downwards between the outer sleeve 9 and the inner sleeve 5 and are deflected by the lower edge of the inner sleeve, and then extend upwards between the inner sleeve and the plunger 12 to which the ends of the foils are attached by a securing member 11. It will be noted from Figures 4 and 5 that the force from the tube 2 and the inner sleeve 5 is transmitted to the outer sleeve 9 by the threads 30 which interconnect the sleeves 5 and 9. The inner sleeve 5 may be provided with a number of axial recesses 31 through which the foils pass downwardly from the supply rolls 7 (Fig. 5).

With the parts in the positions shown in Fig. 1a, the borer is driven down from the surface of the ground to the level at which the extraction of the core has to start. Thereupon, a rod or chain 18 is passed down into the tube 2, 3. By means of a gripping device 22 having hooks 1, the chain 18 engages the pin 4 which is lifted so as to disengage the plunger from the cylinder. The plunger is then held at a constant level by means of the chain 18, a stretching device 16 and the boreframe 17, Fig. 2, whereas the tube and the cylinder are driven down by means of a jack 20. As will be evident from Fig. 1a, a core of the soil will be cut out and gradually coated with the foils unwound from the supply rolls 7. Every time when the tube 2 is to be elongated, the chain 18 is fixed to the uppermost tube portion 19 by means of a locking device, a new tube portion 2, 3 is mounted on the tube, and the locking device is changed over again, thus preventing vertical movements and stress changes in the core of the soil. As a rule, the above named arrangement is sufficient for maintaining the plunger at a constant level. In certain cases, the plunger has to be secured even against upwardly directed forces. The locking device may then be arranged in such a manner that a rod is threaded onto the pin 4 which disengages the locking bolts by being turned through an angle of 90°. In this case, the pin is given a shape somewhat different from that shown in Fig. 1.

After a core of desired length has been cut out, the chain 18 is released from the boreframe and secured to the boretube. Then the borer is lifted by means of the jack, and the core will follow upwards together with the borer. Devices of the type used in common test borers may be provided for cutting off the core from the underlying soil prior to the lifting of the boretube, and devices may also be used for preventing the core from falling out of the borer during the upward movement thereof. Experiments made have proved, however, that such devices can be dispensed with even in pure sand below the level of the ground water.

After the borer has been drawn up, the cylinder is unscrewed and cleaned and charged with a new set of supply rolls, whereupon it is ready for the next boring operation. The core of soil is dragged out of the tube by means of the plunger and the foils which are then taken off from the core and, if possible, used again. Then, the core is examined, and typical specimens are cut out and sent to the laboratory. If, instead thereof, it is desired to send the entire core to the laboratory, the core may be left in the boretube which by means of suitable sockets may be divided into portions suitable for the transport and having their ends closed by covers and sealing means. Alternatively, the core together with the foils may be dragged over into separate longitudinally divided or undivided transport tubes.

Preferably, the inner diameter of the bore-cylinder is somewhat smaller than the inner diameter of the boretube. As the core enters the tube, the horizontal pressure on the core and, consequently, the friction between the foils and the tube will be reduced as a result thereof. In this manner, the pull acting on the foils is decreased to a large extent, and as a result thereof the maximum length of the core obtainable in one operation is increased. To the same end, it is advantageous to provide for lubrication between the foils and the wall of the tube.

The borer may be driven into the ground by pressure as shown in Fig. 2 or by ramming. In hard grounds it may be necessary to use an outer casing and to remove the earth which enters the space between the boretube and said casing, by any suitable known method, such as jetting. Care has to be taken in this case so as not to disturb the earth below the core.

The device shown in Fig. 1 may be simplified by omitting the guide edge and having the foils pass from the supply rolls directly to the core at a place immediately above the supply rolls. In order that the core in such case need not slide too long a distance against the wall of the tube before it reaches the foils, the tube may be shortened between the supply rolls and the cutter. If an outer casing is made use of as indicated in the preceding paragraph, the fact that the cutter will become rather blunt will not result in any inconvenience.

The inner diameter of the borer shown in Fig. 1 may, for instance, amount to 2 to 3 inches, and eight foils may be used having a thickness of one to two thousandths of an inch and consisting of steel or soft iron or any other suitable material. By means of such a borer, very long cores, for instance 18 feet or even more, may be extracted in an undisturbed condition from soils of a character varying between soft mud, clay and compact sand, which was not possible hitherto.

With a borer which permits the extraction of cores having a length of, for instance, 18 feet, the operation may be as follows. The first core is extracted from a hole extending from the ground surface down to a level at 18 feet, the second core is taken from a hole located near the first hole and extending from 16′ to 34′, the third core is taken from the first hole between 32′ and 50′, etc. Due to this overlapping, the ends of the cores, which are always slightly disturbed, can be cut off, and a single undisturbed core can be composed, reaching from the soil surface down to the firm ground.

The axis of each supply roll may be located horizontally and either tangentially with respect to the core, Fig. 3a, or radially, Fig. 3b, or more or less obliquely, Fig. 3c.

In the embodiments illustrated in Figs. 3a and 3c, the supply rolls may be located at the same level above the lower mouth of the boring tube. In the embodiment according to Fig. 3b, the supply rolls are preferably located at two to four different levels.

As the foil passes round the guide edge, it will be buckled to a degree which increases with the width of the foil compared with the diameter of the core. Tests made with steel foils and a core diameter of about 2½ inches have proved that in this instance the width of the foil may be about 1⅝″ at the most without the foil being damaged by buckling. From this it follows that under the conditions indicated at least six foils must be used if it is desired entirely to cover the circumference of the core. This is, however, not necessary, it being on the contrary suitable to provide for a small clearance between adjacent foils so as to prevent the foils from contacting each other and being damaged at their edges. It may, however, prove suitable to use more foils than indicated above, since the thickness of the wall of the borer may be reduced in this case, resulting in a more undisturbed structure of the core.

From the above description it will be evident that while the borer is driven down, sliding will occur between the borer and the foils, and the friction ensued therefrom will exert a pull on the foils without affecting the core. If for some reason the core should tend to move upwards or downwards, such movement is prevented by the friction and adhesion which in such case will occur between the foils and the core. Friction and adhesion which hitherto have been the principal cause of all difficulties, are thus, by means of the foils, turned into useful forces which cause the earth strata entering the borer to maintain their natural thickness and structure.

According as the core during the downward movement of the borer is formed by the cutter at the lower end of the borer, each foil is continuously fed in between the wall of the borer and the core via the guide edge located above the cutter. The foils are supplied to the guide edge either from the upper end of the borer through a passage in the wall of the borer or from supply rolls provided in a recess in the wall of the borer above the guide edge. The foils in the supply rolls may be wound on reels or upon themselves.

According to the lengths, widths and thicknesses of the foils used, the dimensions of the supply rolls will vary and thereby also the most suitable arrangement of the same in the wall of the borer.

What we claim is:

1. A borer for extracting cores of soil from the ground, comprising a boretube constructed and arranged to be driven into the ground and thereby to cut out a core of soil, the lower portion of said boretube comprising two interspaced concentric walls, the outer one of said walls extending downwardly beyond the inner wall, a boring cutter secured to the lower end of said outer wall, circumferentially spaced supply rolls carried by said boretube above the lower end thereof, foils mounted on said rolls and extending downwardly into the space between said walls, the lower end of said inner wall being shaped as a guide and deflecting edge for foils fed from said supply rolls through said space to the inside of the boretube, and means for retaining the foil ends within the boretube at a substantially constant level during the downward movement of the boretube.

2. A borer for extracting cores of soil from the ground, comprising a boretube constructed and arranged to be driven into the ground and thereby to cut out a core of soil, the lower portion of said boretube comprising two interspaced concentric walls, the outer one of said walls extending downwardly beyond the inner wall, a boring cutter secured to the lower end of said outer wall, circumferentially spaced supply rolls carried by said boretube above the lower end thereof, foils mounted on said rolls and extending downwardly into the space between said walls, said foil supply rolls being rotatable about horizontal axis, the lower end of said inner wall being shaped as a guide and deflecting edge for foils fed from said supply rolls through said space to the inside of the boretube, during the downward movement thereof so as to cover at least part of the core entering the boretube, and means for retaining the foil ends within the boretube at a substantially constant level during the downward movement of the boretube.

3. A borer for extracting cores of soil from the ground, comprising a boretube constructed and arranged to be driven into the ground and thereby to cut out a core of soil, means for successively feeding a number of axially extending foils in between the wall of said boretube and the core entering said boretube, means for guiding and deflecting the lower end of the foils to the inside of the boretube, a member axially movable in said boretube, means for securing the foil ends within the boretube to said member, means for retaining said member at a substantially constant level during the downward movement of the boretube, and means for connecting said member to the boretube during the upward movement thereof.

WALTER KJELLMAN.
TORSTEN KARL EDMUND KALLSTENIUS.

REFERENCES CITED

The following references are of record in the file of this patent:

UNITED STATES PATENTS

| Number | Name | Date |
|---|---|---|
| 1,808,009 | Scott | June 2, 1931 |
| 1,849,345 | Cormier | Mar. 15, 1932 |
| 2,234,286 | Stokes | Mar. 11, 1941 |

FOREIGN PATENTS

| Number | Country | Date |
|---|---|---|
| 42,125 | Netherlands | Dec. 15, 1937 |